US011981536B2

(12) United States Patent
Boniface et al.

(10) Patent No.: US 11,981,536 B2
(45) Date of Patent: May 14, 2024

(54) ELEVATOR CAR WITH BLOCKING MEMBER FOR FOLDABLE WORKING PLATFORM

(71) Applicant: Otis Elevator Company, Farmington, CT (US)

(72) Inventors: Fabrice Boniface, Châtillon sur Loire (FR); Morgane Appourchaux, Gien (FR); Aurelien Fauconnet, Isdes (FR); Franck Rivoiret, Les Bordes (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/980,280

(22) Filed: Nov. 3, 2022

(65) Prior Publication Data

US 2023/0391586 A1 Dec. 7, 2023

(30) Foreign Application Priority Data

Jun. 3, 2022 (EP) .................................... 22305810

(51) Int. Cl.
*B66B 11/02* (2006.01)
*B66B 5/00* (2006.01)

(52) U.S. Cl.
CPC .......... *B66B 11/0246* (2013.01); *B66B 5/005* (2013.01)

(58) Field of Classification Search
CPC .......................... B66B 11/0246; B66B 5/0087
See application file for complete search history.

(56) References Cited

U.S. PATENT DOCUMENTS 11,427,441 B2 * 8/2022 Fauconnet ................ B66B 9/00
2007/0056809 A1 * 3/2007 Fernandes ........... B66B 11/0246 187/401
2007/0056810 A1 3/2007 Fernandes et al.
2019/0330024 A1 * 10/2019 Durand ............... B66B 11/0025
2021/0002104 A1 * 1/2021 Fauconnet ............ B66B 5/0087
2021/0061616 A1 * 3/2021 Fauconnet ................ B66B 9/00

FOREIGN PATENT DOCUMENTS

CN 108483165 A * 9/2018
CN 112777455 A * 5/2021 ......... B66B 11/0226
EP 2277817 A1 1/2011

OTHER PUBLICATIONS

Machine Translation of EP 2277817.*
European Search Report for application EP 22305810.8, dated Oct. 28, 2022, 55 pages.

* cited by examiner

*Primary Examiner* — Diem M Tran
(74) *Attorney, Agent, or Firm* — CANTOR COLBURN LLP

(57) ABSTRACT

An elevator car has one or more sidewalls (4*a*, 4*b*) defining an interior space (2) for accommodating passengers; a roof (3) including a support frame (8) and a working platform (12) which is suspendably connected to the support frame (8). The working platform moves between a stowed position, above the interior space, and an operational position, within the interior space. The elevator car also includes a blocking member (20, 21), located at the support frame (8), and arranged to move between an unblocking position and a blocking position. When the blocking member (20, 21) is in the blocking position, the blocking member is configured to prevent the working platform (12) from being moved into the stowed position.

14 Claims, 8 Drawing Sheets

ELEVATOR CAR WITH BLOCKING MEMBER FOR FOLDABLE WORKING PLATFORM

FOREIGN PRIORITY

This application claims priority to European Patent Application No. 22305810.8, filed Jun. 3, 2022, and all the benefits accruing therefrom under 35 U.S.C. § 119, the contents of which in its entirety are herein incorporated by reference.

TECHNICAL FIELD

This disclosure relates to an elevator car with a foldable working platform used to carry out maintenance from inside an elevator car when in an operational position.

BACKGROUND

It is known to provide working platforms located in or above the ceiling of elevator cars, which are moveable between a stowed position and a deployed position. In the deployed position, the working platform is located within the elevator car, at such a height that a maintenance person is able to stand on the working platform and access elevator components through an opening in the elevator car ceiling. Typically, such a working platform is suspended from at least one pair of suspension arms. EP3587333 A1 discloses a working platform that is moveably mounted to a support frame by at least one scissor mechanism. EP3943432 A1 discloses a working platform that is movably mounted to a support frame by an extendable suspension mechanism. It is important for the safety of the maintenance person that the foldable working platform does not return to the stowed position before the maintenance person has finished working.

By utilising a foldable working platform, the overhead distance between the top of a hoistway and the roof of an elevator car may be reduced as a maintenance person may stand primarily within the interior of the elevator car and still access components above the ceiling of the elevator car. The maintenance person may interact with various components during maintenance procedures. It is important for these components to be returned to their normal operational state before the maintenance person folds away the working platform and leaves the elevator car.

SUMMARY OF INVENTION

According to a first aspect of this disclosure there is provided an elevator car comprising: one or more sidewalls arranged to define an interior space for accommodating passengers; a roof comprising a support frame and a working platform, wherein the working platform is suspendably connected to the support frame and moveable between a stowed position, above the interior space, and an operational position, suspended within the interior space; and a blocking member located at the support frame, wherein the blocking member is arranged to move between an unblocking position and a blocking position, wherein, when the blocking member is in the blocking position, the blocking member is configured to prevent the working platform from being moved into the stowed position.

The blocking member advantageously ensures that the working platform cannot be returned to the stowed position until the maintenance person has finished performing any maintenance tasks. In some examples, the physical act of unblocking the blocking member (e.g. by moving it to the unblocking position) may trigger the maintenance person to check that all components accessible from the working platform, that may have been moved or otherwise adjusted during the course of inspection through the elevator roof, have been restored for normal operation of the elevator car. In some examples, the blocking member may only be unblocked (or is automatically unblocked) after certain components have been secured or returned to their normal operational state. As such, the blocking member provides a failsafe and/or check for the maintenance person to ensure that components accessed when using the working platform have been returned to their normal state, e.g. so that they may not be damaged during normal operation of the elevator car.

The working platform can allow the overhead distance between the top of a hoistway and the roof of an elevator car to be reduced. To further minimise the overhead distance, components (i.e. a moveable component as discussed below) located on or above the ceiling of the elevator car may be desirably mounted such that they are, during operation of the elevator car, in a “low height” position, but movable to an “extended position” above the elevator car to allow access and inspection by a maintenance person. In such instances, it may be envisaged that the maintenance person could forget to return the components to the “low height” position after inspection which could lead to the components engaging with the roof of the hoistway when the elevator car is operated normally and damage of the components. The blocking member can avoid such an occurrence.

The blocking member being located at the support frame means that the blocking member may be mounted directly or indirectly to the support frame, or otherwise mounted proximate to the support frame, such that it is configured to prevent the working platform from being moved into the stowed position.

In various examples, the working platform is located at the support frame when in the stowed position. For example, when in the stowed position the working platform is at least partially received within the support frame, i.e. the working platform is substantially in the plane of the support frame.

In some examples, the blocking member is translated and/or rotated between the blocking position and the unblocking position. For example, the blocking member may comprise a pivot point arranged to allow the blocking member to pivot between the blocking position and the unblocking position.

In some examples, the blocking member may comprise a resilient member arranged to bias the blocking member into the blocking position. In such examples, the resilient member may act to translate (e.g. in two dimensions, e.g. horizontally, e.g. vertically) the blocking member from the unblocking positon to the blocking position.

In some examples, the blocking member is arranged to mechanically prevent the working platform from being moved into the stowed position. It will be appreciated that the blocking member may mechanically prevent the working platform from being moved into the stowed position in any suitable and/or desirable way, i.e. by engaging any suitable and/or desirable part of the working platform or the mechanism by which it is suspended from the support frame.

In some examples, the blocking member may be arranged to mechanically prevent the working platform from adopting the stowed position. For example, the blocking member may be arranged such that, when it is in the blocking position, it does not engage with any part of the working platform (or the mechanism by which it is suspended from the support frame, e.g. an extendable suspension arrangement). However, when the working platform is moved upwards (i.e. in the direction required to move it into the stowed position) when the blocking member is still in the blocking position, part of the working platform (or suspension mechanism) may engage with the blocking member such that further upwards movement (e.g. to the stowed position) is prevented.

In some examples, the blocking member is arranged to mechanically prevent the working platform from moving out of the operational position. For example, the blocking member may be arranged such that, when it is in the blocking position, it engages with part of the working platform or mechanism (or the mechanism by which it is suspended from the support frame, e.g. an extendable suspension arrangement) such that it substantially locks the working platform in the operational position.

In some examples, the elevator car further comprises an extendable suspension arrangement arranged to suspend the working platform from the support frame, wherein the blocking member, when in the blocking position, is arranged to physically engage with at least part of the extendable suspension arrangement such that the extendable suspension arrangement is prevented from (e.g. fully) contracting to move the working platform to the stowed position. In some examples, the blocking member physically engages with at least part of the extendable suspension arrangement when the working platform is in the operational position (i.e. when the extendable suspension arrangement is fully extended). In such examples, the blocking member substantially prevents the working platform from moving out of the operational position.

In some examples, the blocking member may physically engage with at least part of the extendable suspension arrangement when the extendable suspension arrangement is partially contracted (i.e. the working platform is at a position between the operational position and the stowed position). In such examples, the blocking member does not physically engage with the extendable suspension arrangement when the working platform is in the operational position but, upon upward movement of the working platform, engages at least part of the extendable working platform to prevent the extendable suspension arrangement from (e.g. fully) contracting to return the working platform to the stowed position.

In some examples, the (e.g. extendable) suspension arrangement comprises at least two arm members, each arm member connected at a first end to the support frame and coupled at a second end to the working platform wherein the arm members are configured to slide parallel to each other, along a sliding direction in a first direction, in order to extend the extendable suspension arrangement when the working platform moves from the stowed position to the operational position, and wherein the arm members are configured to slide parallel to each other, along a sliding direction in a second direction, in order to contract the extendable suspension arrangement when the working platform moves from the operational position to the stowed position.

In some examples, the blocking member physically engages with at least part of at least one (e.g. one, e.g. both, e.g. a plurality) of the (e.g. at least) two arms of the (e.g. extendable) suspension arrangement when the working platform is in the operational position (i.e. when the suspension arrangement is fully extended). In such examples, the blocking member substantially prevents the working platform from moving out of the operational position by preventing the movement of (e.g. at least one of) the arm(s). In some examples, the blocking member does not physically engage with (at least one of) the arm(s) when the working platform is in the operational position but, upon upward movement of the working platform, engages at least part of at least one of the arm(s) to prevent the extendable suspension arrangement from (e.g. fully) contracting to return the working platform to the stowed position.

In some examples, the blocking member is configured to be (e.g. manually or automatically) moved from the unblocking position to the blocking position when the working platform is moved from the stowed position to the operational position. This provides the advantage that the maintenance person does not have to remember to move the blocking member into the blocking position, but rather that it is automatically moved in response to the movement of the working platform.

In some examples, the elevator car further comprises: a moveable component mounted to the elevator car by a mount; wherein the mount is arranged to allow the moveable component to be moved between a first position and a second position relative to the roof. For example, the moveable component is arranged to be accessible by a person standing on the working platform when in the second position. In some examples, the mount may be arranged on the roof, on the support frame, and/or on a sidewall (e.g. at a position proximate to the roof of the elevator car).

In some examples, when the movable component is in the first position and the working platform is in the stowed position, the blocking member is arranged to be in the unblocking position, and when the movable component is in the second position and the working platform is in the operational position, the blocking member is in the blocking position. In such examples, the blocking member acts to prevent the working platform from being moved into the stowed position when the moveable component is in the second position where it would be at risk of damage during normal operation of the elevator car by engaging with the hoistway ceiling.

In some examples, the blocking member is configured to be (e.g. manually or automatically) moved from the unblocking position to the blocking position when the movable component is moved from the first position to the second position. This provides the advantage that the maintenance person does not have to remember to move the blocking member into the blocking position, but rather that it is automatically moved in response to the movement of the moveable component and thus prevents the working platform from being moved into the stowed position before the moveable component has been returned to the first position.

In some examples, the blocking member is configured to be (e.g. manually or automatically) moved from the unblocking position to the blocking position when the working platform is moved from the stowed position to the operational position and the movable component is moved from the first position to the second position.

In some examples, the blocking member is (e.g. electrically or mechanically) coupled to the movable component such that the blocking member is arranged to move from the unblocking position to the blocking position in response to movement of the moveable component from the first position to the second position. For example, when the moveable component is moved from the first position to the second position, the blocking member is moved from the unblocking position to the blocking position, and when the moveable component is moved from the second position to the first position, the blocking member is moved from the blocking position to the unblocking position.

This means that the blocking member is configured to be in the blocking position when the movable component is in the second (e.g. accessible) position. As a result, a maintenance person is not able to move the working platform back into the stowed position while the movable component is in the second (e.g. accessible) position. This can prevent a maintenance person from forgetting to return the movable component back to its first position, especially if the movable component is protruding from the roof in its second (e.g. accessible) position.

In some examples, the blocking member is mechanically coupled to the moveable component such that movement of the moveable component from the first position to the second position causes the blocking member to pivot to the blocking position and/or such that movement of the moveable component from the second position to the first position causes the blocking member to pivot to the unblocking position. In some examples, the blocking member comprises a pivot point arranged to allow the blocking member to pivot between the blocking position and the unblocking position.

In some examples, the blocking member comprises a resilient member (e.g. a spring) arranged to bias the blocking member into the blocking position and the moveable component comprises a latch, wherein when the moveable component is in the first position, the latch is arranged to hold the blocking member against the bias of the resilient member (e.g. a spring) to put the blocking member in the unblocking position when the moveable component is in the second position, the latch is disengaged from the blocking member to allow the bias of the resilient member (e.g. a spring) to move the blocking member to the blocking position.

In some examples, the movable component is one of an electrical box (e.g. car operating board, e.g. junction box), a balustrade, an inspection box, or an emergency stop button.

In some examples, the mount is configured to allow the moveable component to pivot and/or vertically translate and/or horizontally translate between the first position and the second position.

In at least some examples, the moveable component is mounted to a sidewall of the elevator car. In at least some examples, the moveable component is mounted to the roof of the elevator car. In at least some examples, the moveable component is mounted to the support frame. The mount may be arranged on any suitable surface(s) to mount the moveable component to the elevator car such that in the second position the moveable component is accessible by a person standing on the working platform.

In some examples, the moveable component (e.g. an electrical box) is mounted on the sidewall of the elevator car and vertically translatable between a first position and a second position. By mounting the moveable component (e.g. an electrical box) on the elevator car sidewall, rather than on the elevator car roof, the overhead distance may be further minimised. Thus, during operation of the elevator car, the moveable component (e.g. an electrical box) may be in a "low height" (i.e. the first) position. In such a position, the height to which the moveable component (e.g. an electrical box) extends above the elevator car roof is minimised, thus allowing the overhead distance of the elevator car and system to be reduced. However, in such a position, the moveable component (e.g. an electrical box) may be difficult to reach or inspect by a maintenance person. Thus, when the moveable component (e.g. an electrical box) is required to be inspected by a maintenance person, it can be moved to an "extended" (i.e. the second) position above the elevator car to allow access thereto.

In some examples, the elevator car comprises a roof and the mount is arranged to allow the moveable component (e.g. electrical box) to vertically translate from the first position to a second position above the first position. In such examples, the moveable component (e.g. an electrical box) at least partially extends above the roof at least in the second position. By at least partially extending above the roof in the second position, the maintenance person is able to access the components contained within the moveable component (e.g. an electrical box) either from a position on the roof or from a platform (i.e. a landing or a foldable working platform) that allows access to the components on the roof.

In some examples, when the moveable component (e.g. an electrical box) is in the second position, 50% or more of the moveable component (e.g. an electrical box) extends above the roof. In some examples, when the moveable component (e.g. an electrical box) is in the second position, 50% or more of the total volume of the moveable component (e.g. an electrical box) extends above the roof. In some examples, when the moveable component (e.g. an electrical box) is in the second position, 50% or more of the total height of the moveable component (e.g. an electrical box) extends above the roof (i.e. wherein the height is defined as the distance from the upper-most surface of the moveable component (e.g. an electrical box) to the bottom-most surface of the moveable component (e.g. an electrical box) in a direction parallel to the longitudinal axis of the hoistway, i.e. the axis of travel of the elevator car). For example, when the moveable component (e.g. an electrical box) is in the second position, the distance from the top-most point of the box to the roof is greater than the distance from the bottom-most point of the box to the roof.

It will be appreciated that the top-most point of the moveable component (e.g. electrical box) may be defined as the part of the moveable component (e.g. electrical box) that would theoretically provide the first point of contact between the hoistway ceiling and the moveable component (e.g. electrical box) if the moveable component (e.g. electrical box) was moved (e.g. with the elevator car) in an upwardly direction, e.g. if the moveable component (e.g. electrical box) was not returned to the first position after being accessed by the maintenance person and the elevator car was operated normally. Similarly, the bottom-most point of the moveable component (e.g. electrical box) may be defined as the part of the moveable component (e.g. electrical box) which would theoretically provide the first point of contact between the hoistway floor and the moveable component (e.g. electrical box) if the moveable component (e.g. electrical box) was (theoretically) moved in a downwardly direction until contact with the hoistway floor was established. As such, the top and bottom-most points may be defined by the position of wires or components that protrude from the moveable component (e.g. electrical box).

In some examples, the top-most point of the moveable component may be a surface (e.g. the upper-most surface) and the bottom-most point of the moveable component may be a surface (e.g. the bottom-most surface). For example, if the moveable component is a balustrade, the top surface of the balustrade rail may constitute the upper-most surface.

In some examples, when the moveable component is an electrical box, the box may be considered to be a cuboid shape comprising six surfaces. In such examples, the upper-most surface of the electrical box is defined as the upper or top surface of this cuboid (e.g. ignoring any components such as wires that may protrude above this surface), i.e. the surface of the cuboid electrical box which is parallel to and facing towards the hoistway ceiling. Similarly, the bottom-most surface of the electrical box is defined as the bottom surface of the cuboid (e.g. ignoring any components such as wires that may protrude below this surface), i.e. the surface of the cuboid electrical box which is parallel to and facing away from the hoistway ceiling and towards the hoistway floor. In some examples, the top-most point may be on the upper-most surface and/or the bottom-most point may be on the bottom-most surface. In some examples, the top-most point is above the upper-most surface and/or the bottom-most point is below the bottom-most surface.

In some examples, when the moveable component (e.g. electrical box) is in the second position, the electrical box extends above the roof to such an extent as to allow sideways access to one or more (e.g. electrical) components contained within the moveable component (e.g. electrical box). This allows a maintenance person to access the (e.g. electrical) components within the moveable component (e.g. electrical box) when maintenance operations need to be performed.

In some examples, when the moveable component (e.g. electrical box) is in the second position, the bottom-most surface of the moveable component (e.g. electrical box) is substantially parallel with the roof. For example, when the moveable component (e.g. electrical box) is in the first position, the upper-most surface of the moveable component (e.g. electrical box) is above the roof, substantially parallel with the roof, or is below the roof. For example, when the moveable component (e.g. electrical box) is in the first position, the distance from the top-most point of the box to the plane of the roof is less than or equal to the distance from the bottom-most point of the box to the roof.

In some examples, when the electrical box is in the first position, the distance from the top-most point of the moveable component (e.g. electrical box) to the roof is less than 135 mm above the roof.

In some examples, the moveable component is an electrical box mounted to the support frame and vertically translatable between a first position and a second position, wherein the electrical box is mechanically coupled to the blocking member such that the vertical translation of the electrical box causes the blocking member to move between the unblocking position when the electrical box is in the first positon, and the blocking position when the electrical box is in the second position.

In some examples, the moveable component (e.g. electrical box) comprises a guiding component, for example a guiding slot, arranged to receive part of the blocking member (e.g. a pin or protrusion), wherein the guiding slot guides the part of the blocking member received therein when the electrical box is vertically translated from the first position to the second position which, in turn, moves (e.g. pivots) the blocking member between the unblocking position and the blocking position.

DRAWING DESCRIPTION

Some examples of the present disclosure as defined by the appended claims are illustrated further by way of the following non-limiting examples and the accompanying figures, in which:

FIGS. 1*a*, 1*b* and 1*c* are cutaway schematic views of an elevator car including a working platform, moveable between a stowed position (as shown in FIGS. 1*a* and 1*b*) and an operational position (as shown in FIG. 1*c*);

FIGS. 2*a* and 2*b* are cutaway schematic views of an elevator car including a working platform and an electrical box mounted on a sidewall of the elevator car, the electrical box moveable between a first position (as shown in FIG. 2*a*) and a second position (as shown in FIG. 2*b*);

Figure 5A:
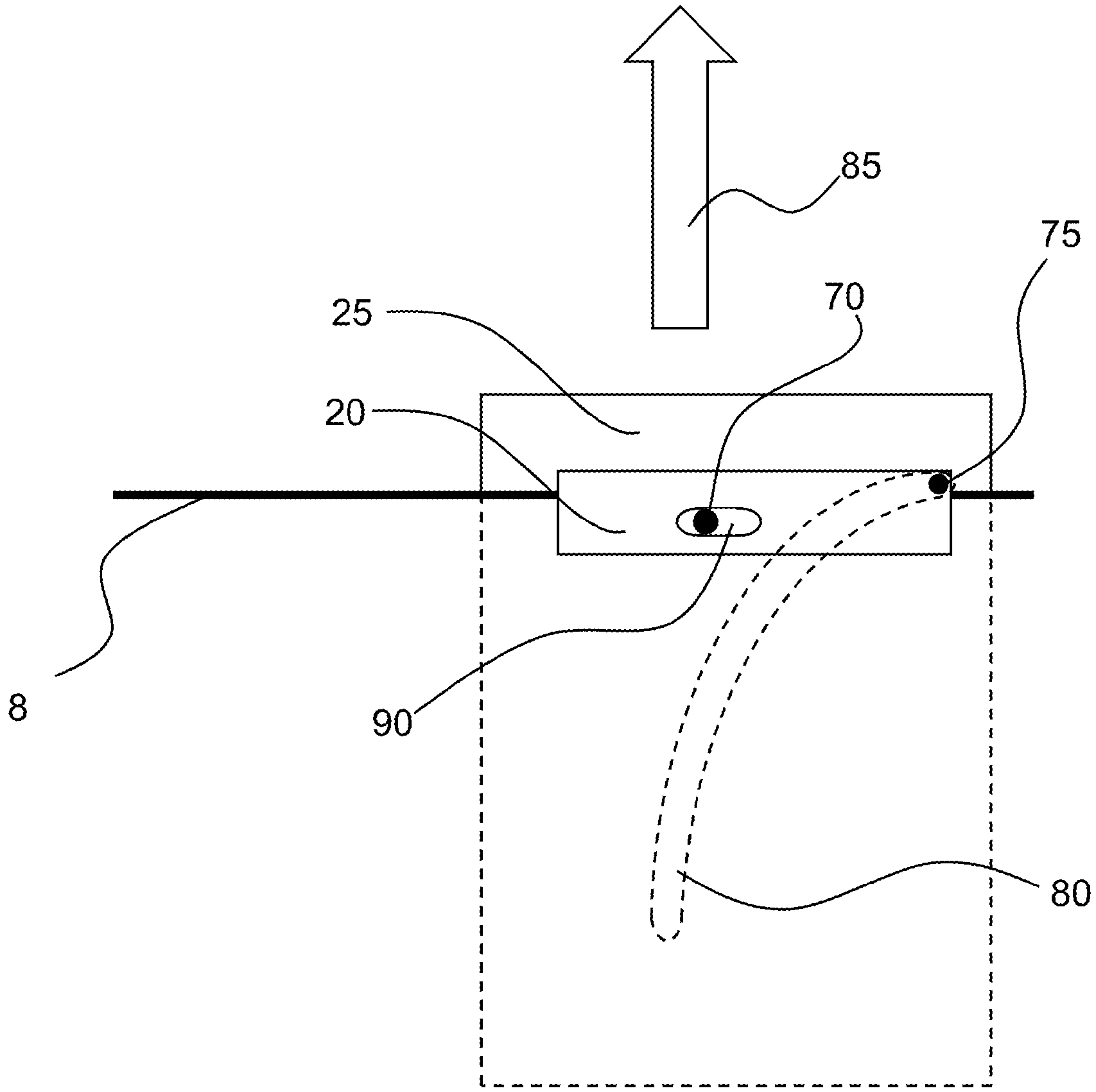
Figure 5B:
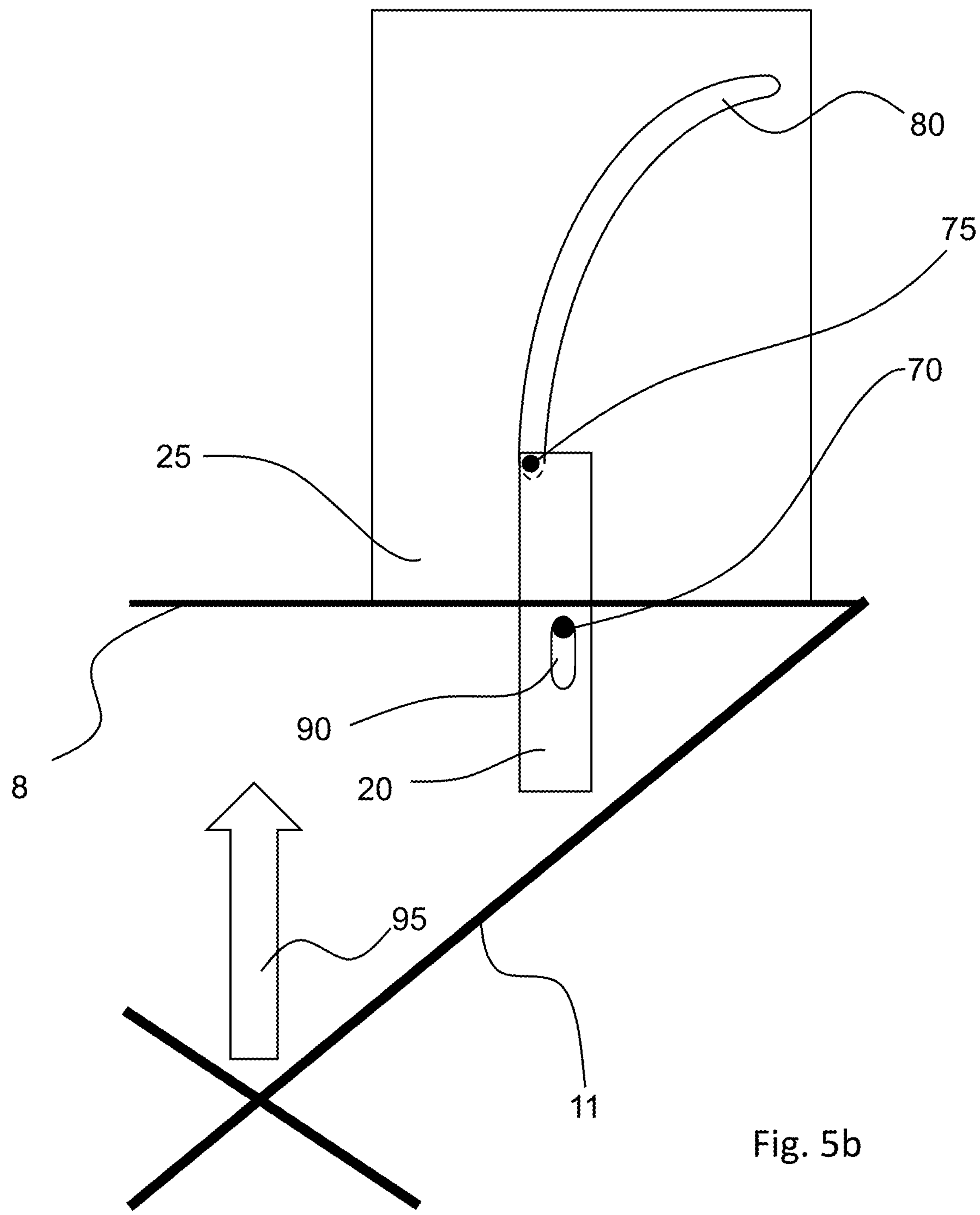
Figure 6A:
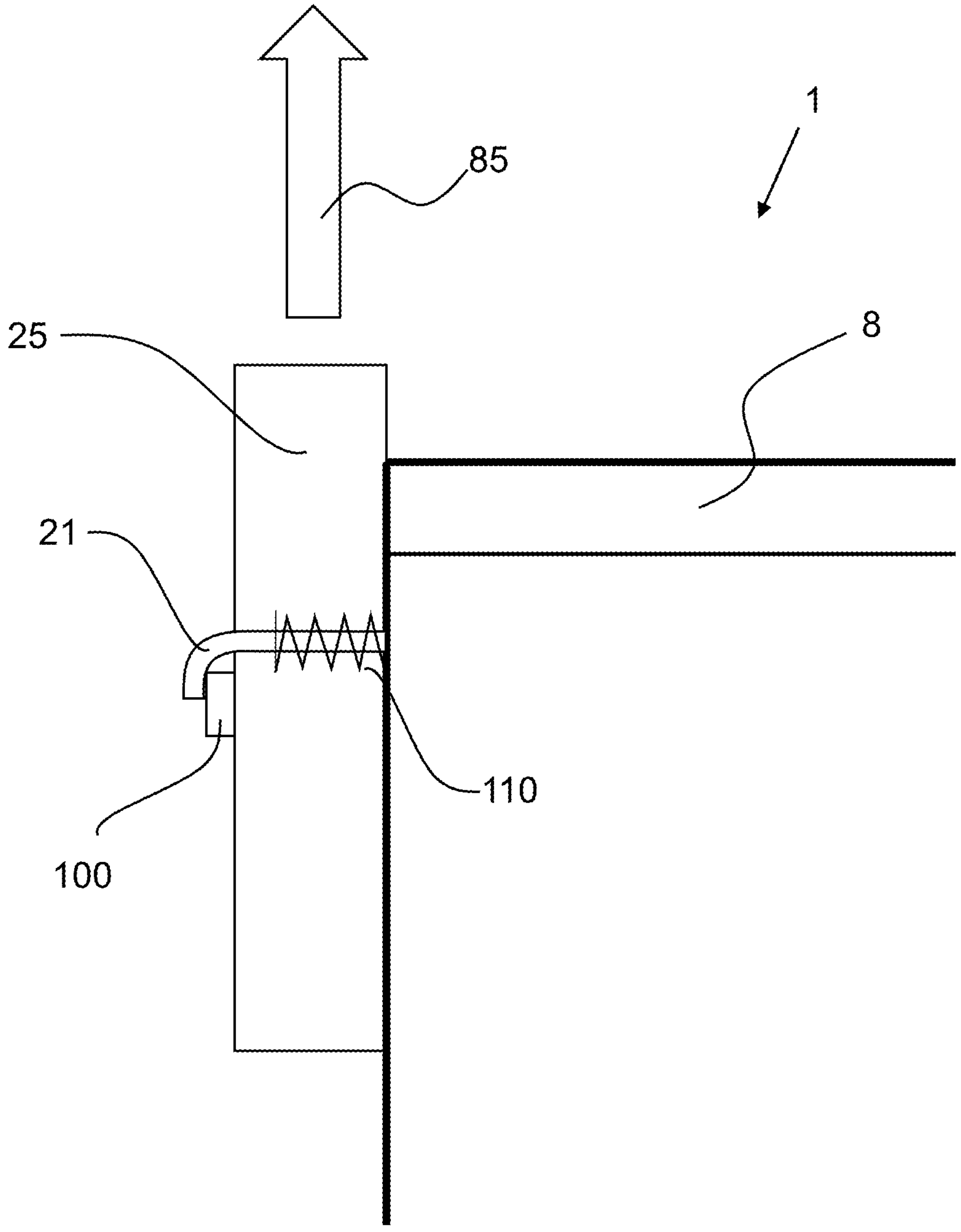
Figure 6B:
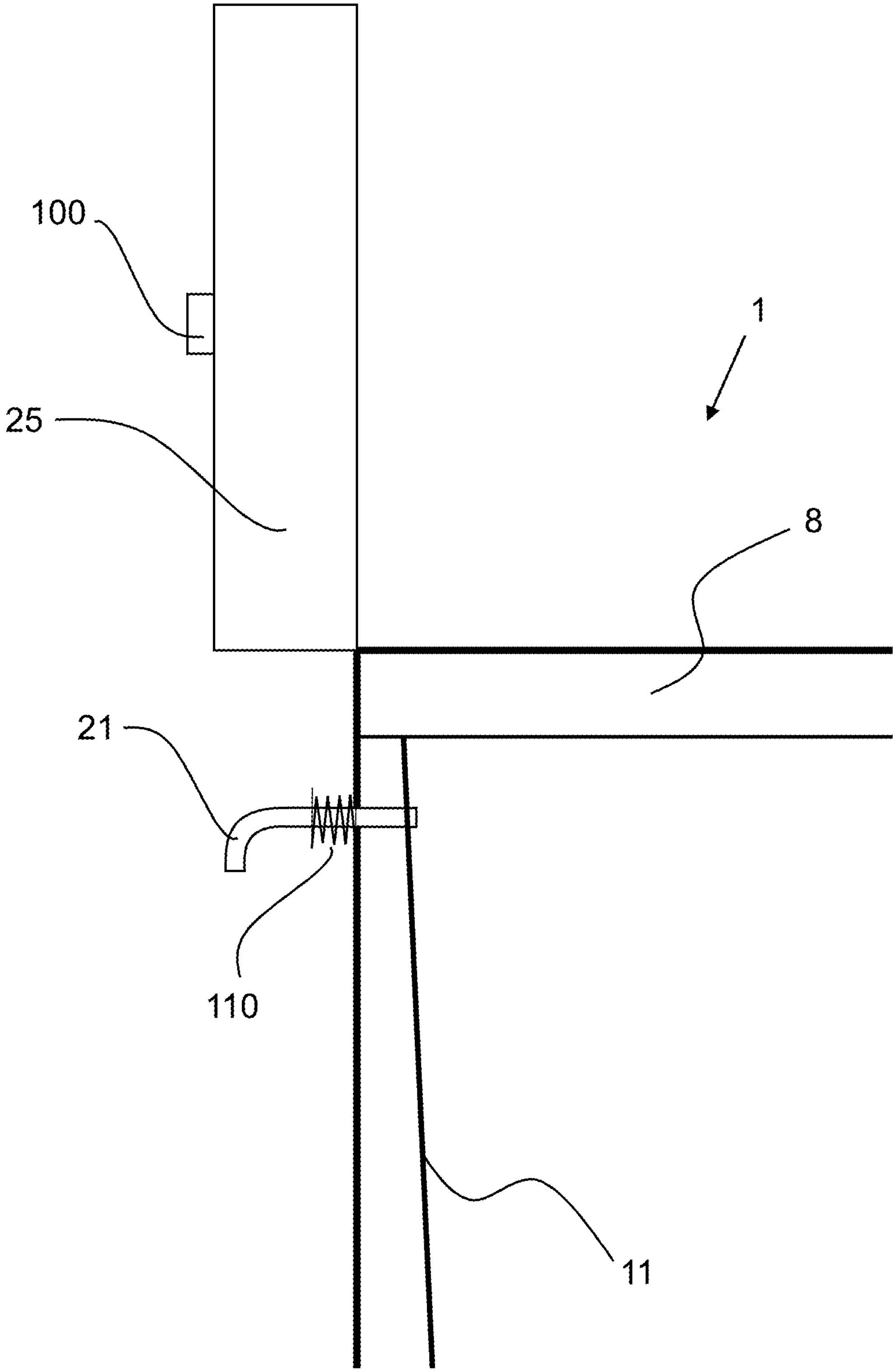

FIGS. 5*a* and 5*b* show a schematic view of an example of the present disclosure, wherein the operational interplay between movement of the electrical box between a first and second position and the movement of the blocking member from the unblocking positon (shown in FIG. 5*a*) and the blocking position (shown in FIG. 5*b*) is depicted; and FIGS. 6*a* and 6*b* show a schematic view of an example of the present disclosure wherein the operational interplay between movement of the electrical box between a first and second position and the movement of the blocking member from the unblocking position (shown in FIG. 6*a*) and the blocking position (shown in FIG. 6*b*) is depicted.

DETAILED DESCRIPTION

Figure 1C:
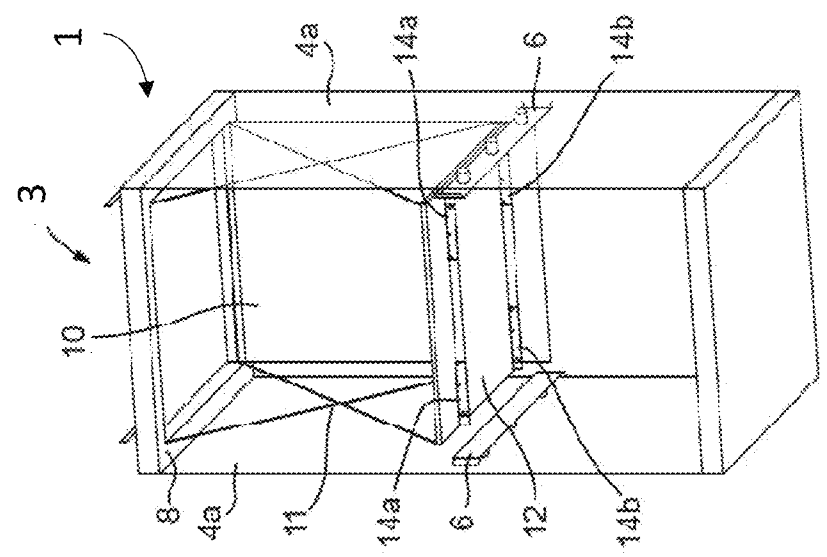
Figure 1B:
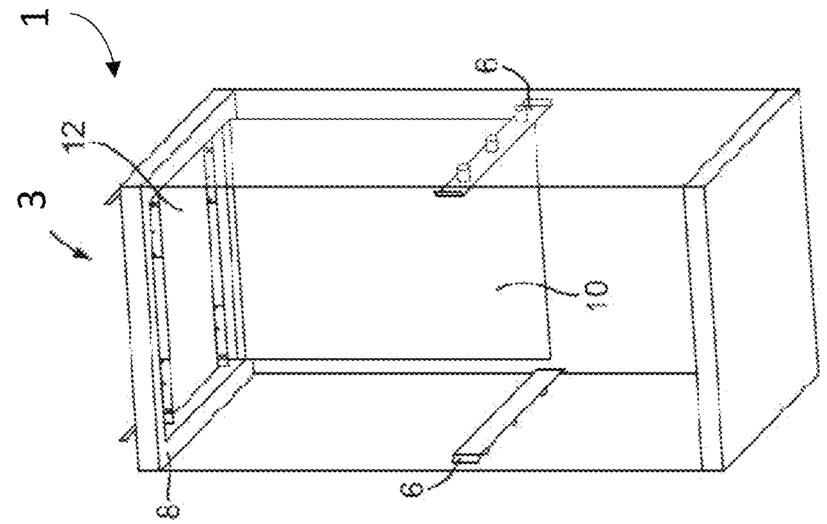
Figure 1A:
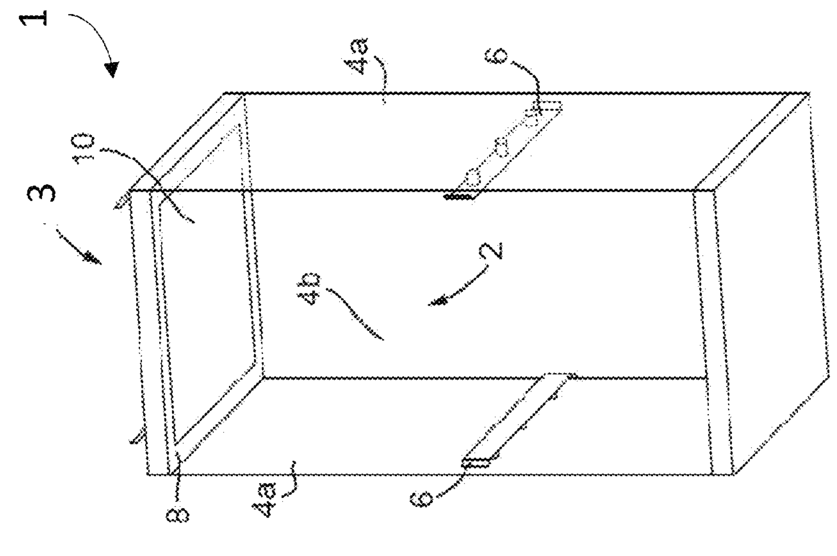

FIG. 1*a* shows a view of an elevator car 1, comprising a roof 3 and side walls 4*a*, 4*b* which define an interior space 2. The elevator car 1 has two opposed side walls 4*a* to which handrails 6 are attached. The elevator car 1 additionally has two opposed side walls 4*b* (only one of which is visible in this figure), on which there are no handrails. Above the interior space 2 there is positioned a support frame 8 comprised in the roof 3, beneath which there is pivotably attached a decorative ceiling cover panel 10. In this arrangement, as shown in FIG. 1*a*, a passenger located within the interior space 2 of the elevator car 1, sees the decorative ceiling cover panel 10 as covering the vast majority, or even the entirety of the elevator car ceiling, such that the support frame 8 is not normally visible.

FIG. 1*b* shows the elevator car 1 of FIG. 1*a*, in which the decorative ceiling cover panel 10 has been pivoted down to an open position. The elements of FIG. 1*b*, which are already labelled in FIG. 1*a*, and could easily be identified as like elements by the skilled person, have not been labelled again in FIGS. 1*b* and 1*c* so as to improve the clarity of the drawings. FIG. 1*b* shows the decorative ceiling cover panel 10 as having been hinged open, from a pivot point in the elevator car ceiling, although it is equally possible that the decorative ceiling cover panel 10 could be fixed in place by any other suitable mechanism, such as for example screws or clips, and could then be removed entirely from the ceiling of the elevator car 1 in order to expose the support frame 8.

Once the cover panel 10 has been pivoted down or removed, the working platform 12 is then visible, located within the support frame 8 above the interior space 2 of the elevator car 1. In the elevator car 1 as shown in FIG. 1*b*, the working platform 12 is still in the stowed positon, but is now accessible such that a maintenance person can move the working platform 12 from the stowed position shown in FIG. 1*b*, to the operational position, as shown in FIG. 1*c*. As is most clearly seen in FIG. 1*c*, an extendable suspension mechanism 11 is arranged to suspendably connect the working platform 12 to the support frame 8. In this example, the extendable suspension mechanism 11 is a scissor mechanism. The scissor mechanism 11 opens out to allow the working platform 12 to drop down to a predetermined height in the elevator car 1 which is at substantially the same height as the handrails 6. The extendable suspension mechanism 11 can be any suitable mechanism which allows the working platform 12 to be moved between the stowed position and the operational position, and adequately supports the working platform 12 (together with any load carried in use) in its operational position.

As shown in FIG. 1*c*, the working platform 12 can be lowered from the stowed position into the interior space 2 of the elevator car 1. This lowered position of the working platform 12 is referred to herein as the operational position. It is in this operational position that a maintenance person can use the working platform 12 to stand on, and thereby access parts of the elevator system through the open ceiling for maintenance purposes. In particular, the height of the working platform 12 in the operational position is ideally at least 1.1 m below the support frame 8, such that a maintenance person standing fully upright on the working platform 12 will protrude out of an opening in the ceiling of the elevator car 1 as provided by the support frame 8. Furthermore, this means that the maintenance person has enough room below the support frame 8 to erect a safety balustrade on the working platform 12, the height of the safety balustrade being at least 1.1 m according to the European Standard EN81-1.

As best seen in FIG. 1*c*, the working platform 12 includes at least one stabilizing member 14, and in this example there are four stabilizing members 14, a first stabilizing member 14*a* and a second stabilizing member 14*b* positioned at opposed sides of the working platform 12 on the left hand side of the elevator car 1, and a first stabilizing member 14*a* and a second stabilizing member 14*b* positioned at opposed sides of the working platform 12 on the right hand side of the elevator car 1. Each of the stabilizing members 14*a*, 14*b* can be engaged with the handrails 6 on the side wall 4*a* of the elevator car 1 in order to provide lateral stability to the working platform 12.

Figure 2B:
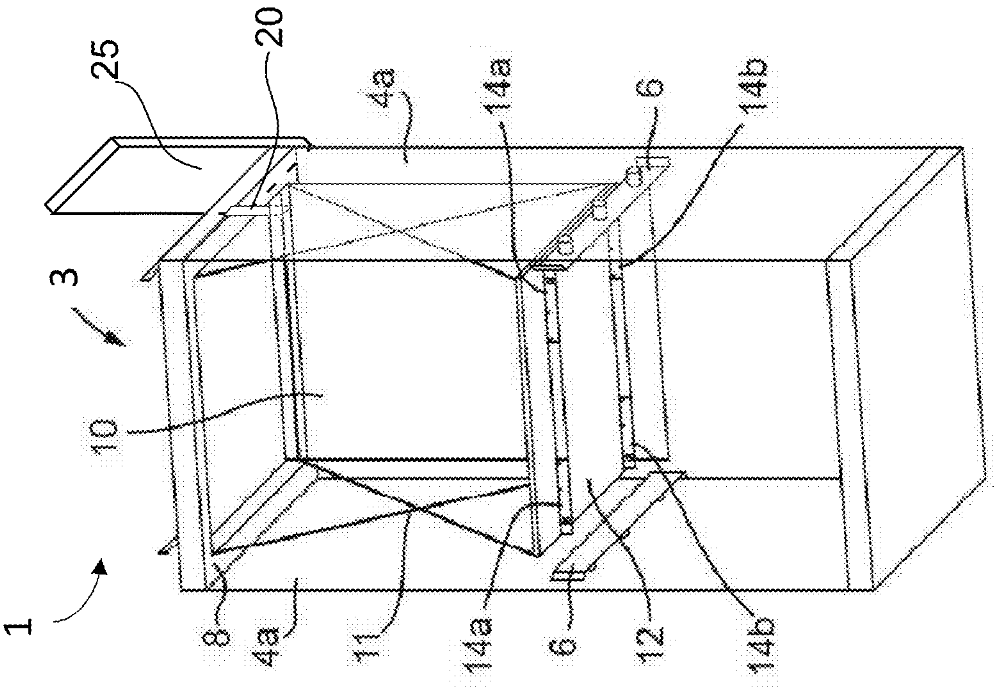
Figure 2A:
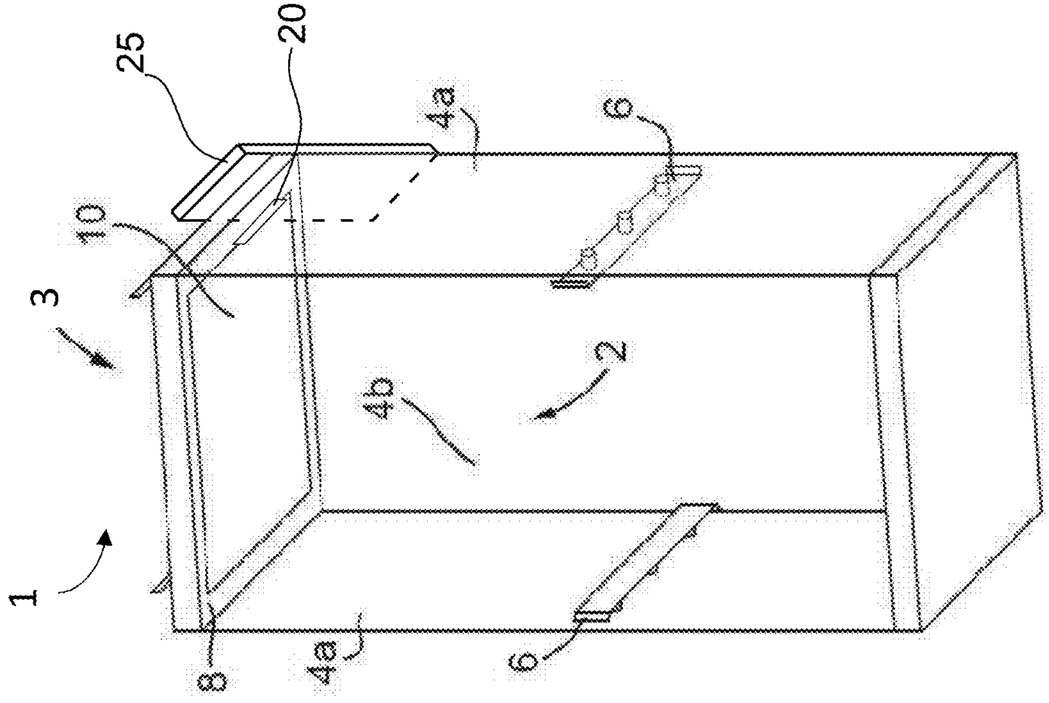

FIGS. 2*a* and 2*b* show a view of an elevator car 1 comprising a movable component 25 in the form of an electrical box mounted thereto by a mount (not shown here). To ease understanding, in the following, the term "electrical box 25" is used. However, the skilled person will understand that any other movable component may be mounted to the elevator car 1 so as to be moved between a first position and a second position relative to the roof 3. In this example, the mount is arranged to allow the electrical box 25 to vertically translate between a first position (as shown in FIG. 2*a*) and a second position (as shown in FIG. 2*b*) relative to the roof 3. The electrical box 25 can be mounted to the sidewall 4*a* and/or to the support frame 8 and/or to the roof 3. As seen in the example of FIG. 2*b*, the electrical box 25 can be vertically translated upwards so as to at least partially extend above the roof 3 in the second position.

The elevator car 1 further comprises a blocking member 20 mounted (directly or indirectly) to the support frame 8, wherein the blocking member 20 is arranged to move between an unblocking position (as shown in FIG. 2*a*) and a blocking position (as shown in FIG. 2*b*), wherein, when the blocking member 20 is in the blocking position, the blocking member 20 is configured to prevent the working platform 12 from being moved into the stowed position.

It should be noted that the positions of the electrical box 25 and the blocking member 20 are not necessarily related and their movements may be independent of one another. As such, in addition to the arrangements shown in FIGS. 2*a* and 2*b*, it can be envisaged that the electrical box 25 may be movable to the first position when the blocking member 20 is in the blocking position, for example with a manual operation required to move the blocking member 20 to the unblocking position before the platform can be stowed away. It can also be envisaged that the electrical box may be movable to the second position when the blocking member 20 is in the unblocking position, for example with a manual operation required to move the blocking member 20 to the blocking position while the electrical box 25 remains in the second position.

Similarly, it should be noted that the positions of the electrical box 25 and the working platform 12 are not necessarily related. Indeed, it may be envisaged that the working platform 12 may be in the operational position and the electrical box is in the first position (e.g. if the maintenance person is not interested in inspecting the electrical box 25). When the working platform 12 is in the operational position, the blocking member 20 may be in the blocking position or the unblocking position according to different examples of the disclosure. In contrast, the working platform 12 may only occupy the stowed position when the blocking member 20 is in the unblocking position (as shown in FIG. 2*a*).

Figure 3:
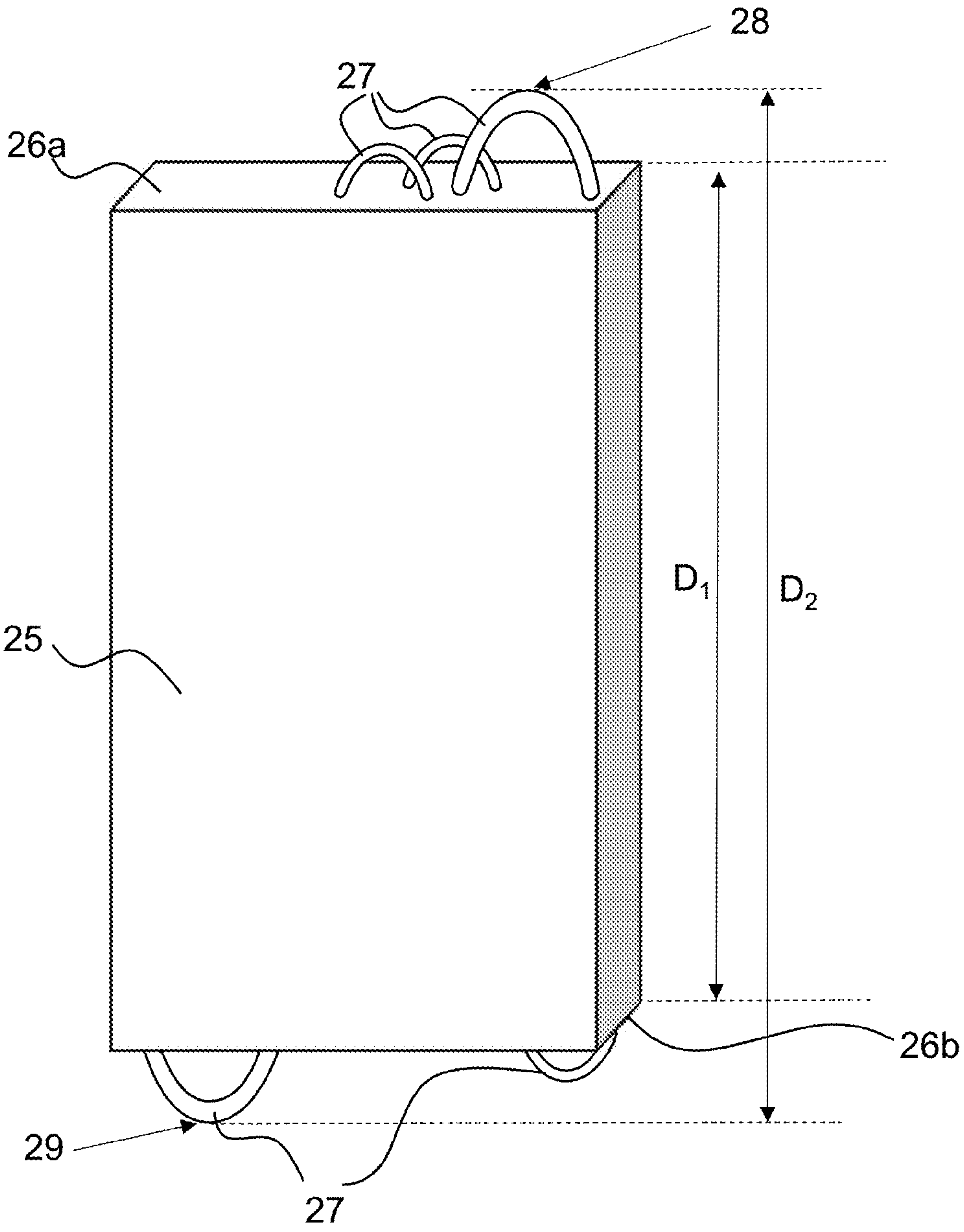
FIG. 3 shows a side view of an electrical box.

FIG. 3 shows a side view of a cuboid-shaped electrical box 25 comprising a upper-most surface 26*a* and a bottom-most surface 26*b* which correspond to the top and bottom sides of a cuboid. The height of the electrical box 25 may therefore be defined as the distance $D_1$ from the upper-most surface 26*a* of the electrical box 25 to the bottom-most surface 26*b* of the electrical box 25.

In some examples of the disclosure, the electrical box 25 may be a cuboid in shape (thus comprising an upper-most surface 26*a* and a bottom-most surface 26*b*) with some components such as electrical wires 27 protruding therefrom. As such the top-most point 28 of the electrical box 25 may be above the upper-most surface 26*a* of the electrical box 25. The top-most point 28 may therefore be considered to be the part of the electrical box 25 which would, if it was theoretically moved vertically upwards infinitely, would engage the ceiling of the hoistway of the elevator system first. Similarly, the bottom-most point 29 may be below the bottom-most surface 26*b* of the electrical box 25 wherein the bottom-most point 29 may be considered to be the part of the electrical box 25 which, if it was theoretically moved vertically downwards infinitely, would engage the floor of the hoistway of the elevator system first. The distance $D_2$ from the top-most point 28 of the electrical box 25 to the bottom-most point 29 of the electrical box defines the total height of the electrical box 25 (i.e. the largest dimension of the electrical box 25).

In some examples, the top-most point 28 of the electrical box 25 may correspond to the upper-most surface 26*a* and the bottom-most point 29 of the electrical box 25 may correspond to be the bottom-most surface 26*b*.

Figure 4:
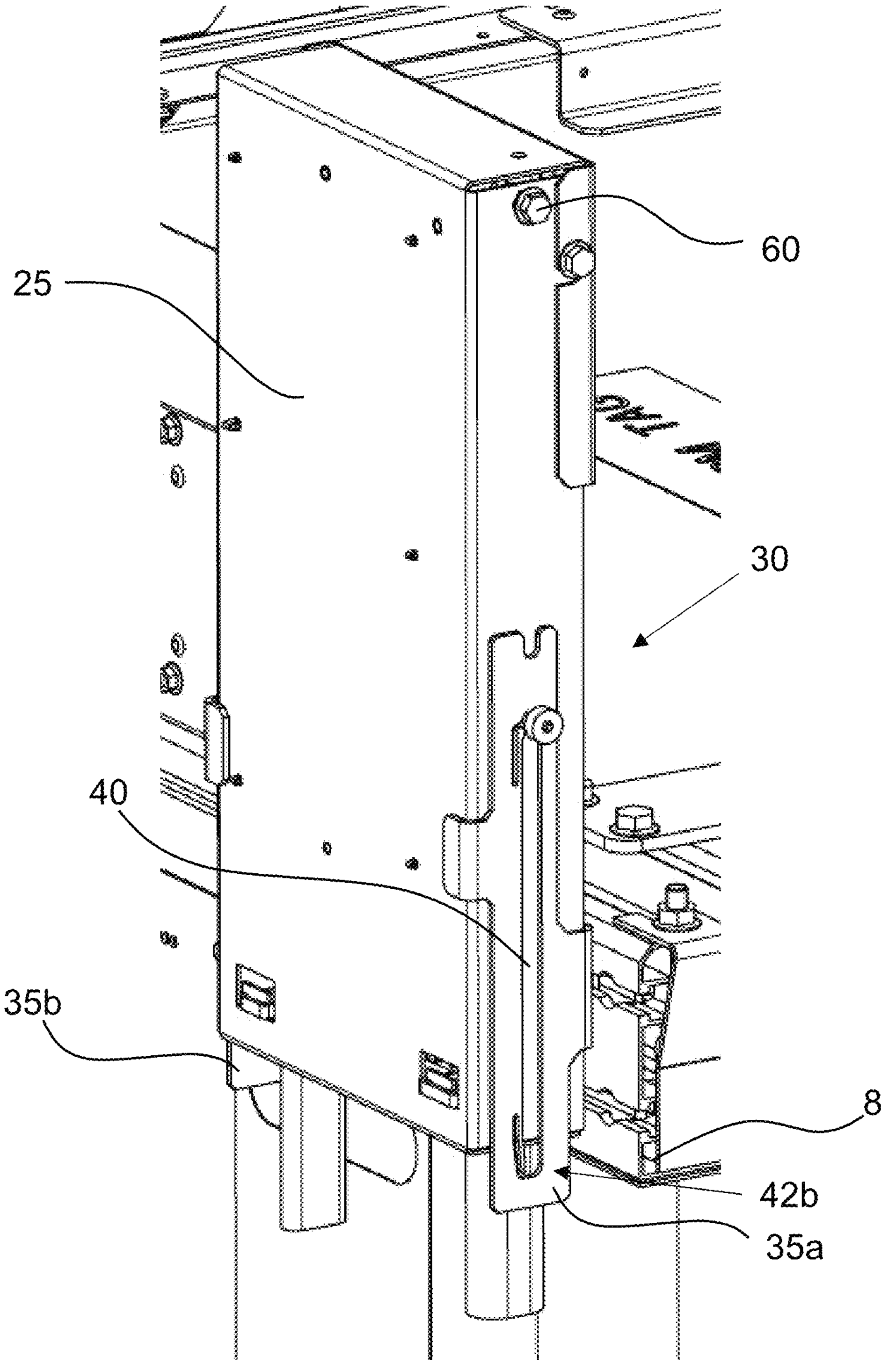
FIG. 4 shows a view of an electrical box mounted on an elevator car sidewall by a mount, wherein the electrical box is held in the second position.

FIG. 4 shows an example of an electrical box 25 mounted on the support frame 8 by a mount 30, wherein the electrical box 25 is held in the second position. The mount 30 shown comprises two guide components 35*a*, 35*b* positioned either side of the electrical box 25 and arranged to mount the electrical box 25 to the support frame 8 of the elevator car. The guide components 35*a*, 35*b* guide the vertical movement of the electrical box 25 between the first position and the second position.

FIGS. 5*a* and 5*b* show an example whereby movement of a moveable component, in this case the electrical box 25, results in the movement of the blocking member 20 from the unblocking position (shown in FIG. 5*a*) to the blocking position (shown in FIG. 5*b*). As a general note regarding FIGS. 5*a* and 5*b*, a dashed line represents an obstructed object, i.e. an object that is behind another component and thus ordinarily not visible, but shown for completeness.

In this example, the electrical box 25 comprises a guiding slot 80 which is arranged to receive a pin 75. The pin 75 couples the blocking member 20 to the electrical box 25. The pin 75 passes through the blocking member 20 into the slot 80 and thus provides the ability to couple the position of the blocking member 20 to the position of the electrical box 25. As shown in FIG. 5*a*, when the electrical box 25 is in the first position, the pin 75 is received at the top of the guiding slot 80. Upon vertical translation of the electrical box 25 upwards, in the direction shown by the arrow 85, the pin 75 is consequently guided along the slot 80 and the blocking member 20 is caused to pivot about a pivot pin 70. The pivot pin 70 is received within a second slot 90 and secures the blocking member 20 to the support frame 8. The degrees of freedom provided by the second slot 90 and the guiding slot 80 allows the blocking member 20 to be rotated from the unblocking position to the blocking position shown in FIG. 5*b*. As shown in FIG. 5*b*, when the blocking member 20 is in the blocking position, the pin 75 is at the bottom of the guiding slot 80 and the blocking member 20 extends into the interior space of the elevator car.

In the example shown in FIG. 5*b*, the blocking member 20 does not necessarily engage the extendable suspension mechanism 11, but is positioned such that, upon movement of the working platform upwards, in the direction shown by the arrow 95, the arms of the extendable suspension mechanism 11 will engage with the blocking member 20 and be prevented from fully contracting to return the working platform to the stowed position.

FIGS. 6*a* and 6*b* show another example whereby movement of a moveable component, in this case the electrical box 25, results in the movement of a blocking member 21 from the unblocking position (shown in FIG. 6*a*) to the blocking position (shown in FIG. 6*b*). In this example, the electrical box 25 is mounted to the support frame 8 (optionally via a mount—not shown). In this example, the electrical box 25 includes a latch 100 which is positioned such that, when the electrical box 25 is in the first position, the blocking member 21 can be engaged (i.e. hooked) over the latch 100 to hold it in the unblocking position (shown in FIG. 6*a*). The blocking member 21 comprises a resilient member 110 in the form of a spring which, when in the unblocking position, is held in an extended state by virtue of the blocking member 21 being held back by the latch 100.

When the electrical box 25 is moved vertically upwards, i.e. in the direction shown by the arrow 85, the latch 100 is also moved and the blocking member 21 is disengaged from the latch 100 such that the resilient member 110 returns to its natural length and acts to move the blocking member 21 into the blocking position. The blocking member 21 therefore moves automatically into the blocking position under the spring's natural bias. When in the blocking position, the blocking member 21 may engage with one or more of the arms of the extendable suspension mechanism 11, as shown schematically in FIG. 6*b*. Alternatively, the blocking member 21 in the blocking position may interfere with the extendable suspension mechanism 11 when the working platform 12 is moved upwards in an attempt to return it to the stowed position.

What is claimed is:

1. An elevator car (1) comprising:

one or more sidewalls (4*a*, 4*b*) arranged to define an interior space (2) for accommodating passengers;

a roof (3) comprising a support frame (8) and a working platform (12), wherein the working platform (12) is suspendably connected to the support frame (8) and moveable between a stowed position, above the interior space (2), and an operational position, suspended within the interior space (2); and a blocking member (20, 21) located at the support frame (8), wherein the blocking member (20, 21) is arranged to move between an unblocking position and a blocking position, wherein, when the blocking member (20, 21) is in the blocking position, the blocking member is configured to prevent the working platform (12) from being moved into the stowed position;

wherein the elevator car (1) further comprises:

a movable component (25) mounted to the elevator car (1) by a mount (30);

wherein the mount (30) is arranged to allow the movable component (25) to be moved between a first position and a second position relative to the roof (3);

wherein the mount (30) is configured to allow the movable component (25) to vertically translate between the first position and the second position, wherein the moveable component (25) at least partially extends above the roof (3) in the second position.

2. The elevator car (1) of claim 1, wherein the blocking member (20, 21) is arranged to mechanically prevent the working platform (12) from being moved into the stowed position.

3. The elevator car (1) of claim 1, further comprising an extendable suspension arrangement (11) arranged to suspend the working platform (12) from the support frame (8), wherein the blocking member (20, 21), when in the blocking position, is arranged to physically engage with at least part of the extendable suspension arrangement (11) such that the extendable suspension arrangement (11) is prevented from contracting to move the working platform (12) to the stowed position.

4. The elevator car (1) of claim 1, wherein the blocking member (20, 21) is configured to be moved from the unblocking position to the blocking position when:

the working platform (12) is moved from the stowed position to the operational position.

5. The elevator car (1) of claim 1, wherein, when the movable component (25) is in the first position and the working platform (12) is in the stowed position, the blocking member (20, 21) is arranged to be in the unblocking position, and when the movable component (25) is in the second position and the working platform (12) is in the operational position, the blocking member (20, 21) is arranged to be in the blocking position.

6. The elevator car (1) of claim 1, wherein the blocking member (20, 21) is configured to be moved from the unblocking position to the blocking position when:

the movable component (25) is moved from the first position to the second position.

7. The elevator car (1) of claim 1, wherein the blocking member (20, 21) is coupled to the movable component (25) such that the blocking member (20, 21) is arranged to move from the unblocking position to the blocking position in response to movement of the moveable component (25) from the first position to the second position.

8. The elevator car (1) of claim 1, wherein the blocking member (20, 21) is coupled to the movable component (25) such that the blocking member (20, 21) is arranged to move from the blocking position to the unblocking position in response to movement of the moveable component (25) from the second position to the first position.

9. The elevator car (1) of claim 1, wherein the blocking member (20) is mechanically coupled to the moveable component (25) such that movement of the moveable component (25) from the first position to the second position causes the blocking member (20) to pivot to the blocking position; and/or wherein the blocking member (20) is mechanically coupled to the moveable component (25) such that movement of the moveable component (25) from the second position to the first position causes the blocking member (20) to pivot to the unblocking position.

10. The elevator car (1) of claim 1, wherein the movable component (25) is one of: an electrical box (e.g. car operating board, e.g. a junction box), a balustrade, an inspection box, or an emergency stop button.

11. The elevator car (1) of claim 1, wherein the blocking member (21) comprises a resilient member (110) arranged to bias the blocking member (21) into the blocking position.

12. The elevator car (1) of claim 11, wherein the moveable component (25) comprises a latch (100) and wherein, when the moveable component (25) is in the first position, the latch (100) is arranged to hold the blocking member (21) against the bias of the resilient member (110) to put the blocking member (21) in the unblocking position and, when the moveable component (25) is in the second position, the latch (100) is disengaged from the blocking member (21) to allow the bias of the resilient member (110) to move the blocking member (21) to the blocking position.

13. An elevator car (1) comprising:

one or more sidewalls (4*a*, 4*b*) arranged to define an interior space (2) for accommodating passengers;

a roof (3) comprising a support frame (8) and a working platform (12), wherein the working platform (12) is suspendably connected to the support frame (8) and moveable between a stowed position, above the interior space (2), and an operational position, suspended within the interior space (2); and a blocking member (20, 21) located at the support frame (8), wherein the blocking member (20, 21) is arranged to move between an unblocking position and a blocking position, wherein, when the blocking member (20, 21) is in the blocking position, the blocking member is configured to prevent the working platform (12) from being moved into the stowed position;

wherein the elevator car (1) further comprises:

a movable component (25) mounted to the elevator car (1) by a mount (30);

wherein the mount (30) is arranged to allow the movable component (25) to be moved between a first position and a second position relative to the roof (3);

wherein the movable component (25) is mounted to the support frame (8) and vertically translatable between a first position and a second position, wherein the movable component (25) is mechanically coupled to the blocking member (20, 21) such that the vertical translation of the movable component (25) causes the blocking member (20, 21) to move between the unblocking position when the movable component (25) is in the first position, and the blocking position when the movable component (25) is in the second position.

14. The elevator car (1) of claim 13, wherein the movable component (25) comprises an electrical box.

* * * * *